US009927095B2

(12) United States Patent
Ichihashi et al.

(10) Patent No.: US 9,927,095 B2
(45) Date of Patent: Mar. 27, 2018

(54) ILLUMINATING DEVICE AND PLANT GROWTH REGULATION METHOD

(71) Applicant: Fujifilm Corporation, Tokyo (JP)

(72) Inventors: Mitsuyoshi Ichihashi, Ashigarakami-gun (JP); Yoshihisa Usami, Ashigarakami-gun (JP); Wataru Majima, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 126 days.

(21) Appl. No.: 14/059,060

(22) Filed: Oct. 21, 2013

(65) Prior Publication Data
US 2014/0041296 A1 Feb. 13, 2014

Related U.S. Application Data

(63) Continuation of application No. PCT/JP2012/060053, filed on Apr. 12, 2012.

(30) Foreign Application Priority Data

Apr. 22, 2011 (JP) ................................. 2011-095642

(51) Int. Cl.
F21V 9/14 (2006.01)
A01G 7/04 (2006.01)
G02B 5/30 (2006.01)

(52) U.S. Cl.
CPC ............... F21V 9/14 (2013.01); A01G 7/045 (2013.01); G02B 5/3083 (2013.01); Y02P 60/146 (2015.11)

(58) Field of Classification Search
CPC .. F21V 9/14; G02B 1/10–1/18; G02B 5/3083; A01G 7/045
See application file for complete search history.

(56) References Cited

U.S. PATENT DOCUMENTS

2008/0137191 A1* 6/2008 Saitoh ................... G02B 1/105
359/487.05
2010/0067212 A1* 3/2010 Kamada ................... F21V 9/14
362/19

FOREIGN PATENT DOCUMENTS

JP 2-283217 A 11/1990
JP 2-283218 A 11/1990
(Continued)

OTHER PUBLICATIONS

International Search Report, issued in PCT/JP2012/060053, dated Jul. 17, 2012.
(Continued)

Primary Examiner — Andrew Coughlin
Assistant Examiner — Nathaniel Lee
(74) Attorney, Agent, or Firm — Birch, Stewart, Kolasch & Birch, LLP

(57) ABSTRACT

The present invention provides an illuminating device that makes it possible to reduce the number of members for regulating a polarization state and can irradiate light having natural color shades without decreasing energy efficiency of light irradiation, and a plant growth regulation method using the illuminating device. The illuminating device of the present invention includes a light-emitting light source and a polarization state regulation member that regulates a polarization state of the light-emitting light source, in which the polarization state of a wavelength region of a portion of emission wavelengths is changed to circular polarization, and a degree of circular polarization of light in a wavelength band for regulation among the light rays to be irradiated is 0.3 or higher. In a preferable embodiment, a width of at least one wavelength band for regulation of the polarization state regulation member is from 60 nm to 250 nm.

11 Claims, 2 Drawing Sheets

(56) References Cited

FOREIGN PATENT DOCUMENTS

| | | |
|---|---|---|
| JP | 2003-43460 A | 2/2003 |
| JP | 2003-307622 A | 10/2003 |
| JP | 2004-252082 A | 9/2004 |
| JP | 2007-20439 A | 2/2007 |
| JP | 2007-222039 A | 9/2007 |
| JP | 2008-228688 A | 10/2008 |
| JP | 2010-73494 A | 4/2010 |
| WO | WO 2010/004489 A1 | 1/2010 |
| WO | WO 2010004489 A1 * 1/2010 ............. A01G 7/045 |

OTHER PUBLICATIONS

Written Opinion of the International Search Authority, issued in PCT/JP2012/060053, dated Jul. 17, 2012.
Extended European Search Report dated Sep. 30, 2014, issued in corresponding European Patent Application No. 12774627.9.
Japanese Office Action dated Sep. 30, 2014, issued in corresponding Japanese Patent Application No. 2011-095642.

* cited by examiner

ILLUMINATING DEVICE AND PLANT GROWTH REGULATION METHOD

CROSS REFERENCE TO RELATED APPLICATIONS

This application is a Continuation of PCT International Application No. PCT/JP2012/060053 filed on Apr. 12, 2012, which claims priority under 35 U.S.C. § 119(a) to Patent Application No. 2011-095642 filed in Japan on Apr. 22, 2011, all of which are hereby expressly incorporated by reference into the present application.

BACKGROUND OF THE INVENTION

1. Field of the Invention

The present invention relates to an illuminating device and a plant growth regulation method using the same.

2. Description of the Related Art

Conventionally, in a plant factory which is a system for planned production of plants in a closed or a semi-closed space having a controlled internal environment, the growth is regulated by adjusting the temperature, fertilizers, time of light irradiation, illuminance, and the like.

In recent years, there has been a report regarding a method for promoting raising of plants by means of regulating the quality of light in such a plant factory (see JP2007-222039A). Moreover, a plant growth regulation method by the irradiation of polarized light has been proposed (see JP2008-228688A, JP1990-283217A (JP-H02-283217A), and JP1990-283218A (JP-H02-283218A)).

However, in the illuminating devices described in JP2007-222039A, JP2008-228688A, JP1990-283217A (JP-H02-283217A), and JP1990-283218A (JP-H02-283218A), a large number of members for regulating polarization state are required, and this leads to a problem that the cost of the device increases. In addition, an illuminating device that can irradiate light having natural color shades uses a large number of light sources for light irradiation, and this leads to a problem that energy efficiency becomes poor.

The present invention has been made in consideration of the above circumstances, and aims to solve the various conventional problems described above and achieve the following objects. That is, an object of the present invention is to provide an illuminating device that makes it possible to reduce the number of members for regulating a polarization state and can irradiate light having natural color shades without decreasing energy efficiency of light irradiation, and a plant growth regulation method using the illuminating device.

SUMMARY OF THE INVENTION

In order to achieve the above object, the present inventors repeated thorough research. As a result, they found that an illuminating device, which includes a light-emitting light source and a polarization state regulation member that regulates a polarization state of the light-emitting light source, and in which the polarization state of a wavelength region of a portion of light-emitting wavelengths is changed to circular polarization, and a degree of circular polarization of light in the wavelength band for regulation among the light rays to be irradiated is 0.3 or higher, focuses on circular polarization absorption dichroism of plants and can irradiate natural light as is outside the wavelength region, and accordingly, the number of members for regulating the polarization state can be reduced without decreasing the light amount required for photosynthesis or the like, and light having natural color shades can be irradiated without decreasing energy efficiency of the light irradiation.

The present invention is based on the above findings obtained by the inventors, and means for solving the above problems are as follows. That is, <1> An illuminating device including a light-emitting light source, and a polarization state regulation member that regulates a polarization state of the light-emitting light source, in which the polarization state of a wavelength region of a portion of emission wavelengths is changed to circular polarization, and a degree of circular polarization of light in a wavelength band for regulation among the light rays to be irradiated is 0.3 or higher, <2> The illuminating device according to <1>, in which a width of at least one wavelength band for regulation of the polarization state regulation member is from 60 nm to 250 nm, <3> The illuminating device according to <1> or <2>, in which the polarization state regulation member is a circular polarizing plate, <4> The illuminating device according to <1> or <2>, in which the polarization state regulation member is a circularly polarized light-reflecting plate, <5> The illuminating device according to <4>, in which the circularly polarized light-reflecting plate has a cholesteric liquid crystal structure, <6> The illuminating device according to <4>, in which the circularly polarized light-reflecting plate is composed of a linearly polarized light-reflecting plate and a λ/4 wave plate, <7> The illuminating device according to <5>, in which the circularly polarized light-reflecting plate has two or more wavelength polarization-regulating regions, <8> The illuminating device according to any one of <4> to <7>, further including one of a diffuser plate and retardation plate between the light-emitting light source and the circularly polarized light-reflecting plate, <9> The illuminating device according to <8>, in which a phase difference in an in-plane direction of the retardation plate is 300 nm or more when being measured under a wavelength condition of 550 nm, and <10> A plant growth regulation method that uses the illuminating device according to any one of <1> to <9> as an irradiation light source.

According to the present invention, various conventional problems can be solved, and an illuminating device that makes it possible to reduce the number of members for regulating a polarization state and can irradiate light having natural color shades without decreasing energy efficiency of light irradiation and a plant growth regulation method using the illuminating device can be provided.

DESCRIPTION OF THE PREFERRED EMBODIMENTS (Illuminating Device)

The illuminating device of the present invention includes a light-emitting light source and a polarization state regulation member, and optionally further includes other members such as a reflective member, a heat-dissipating member, an infrared-absorbing member, a UV-absorbing member, a lens, and a prism.

Figure 1:
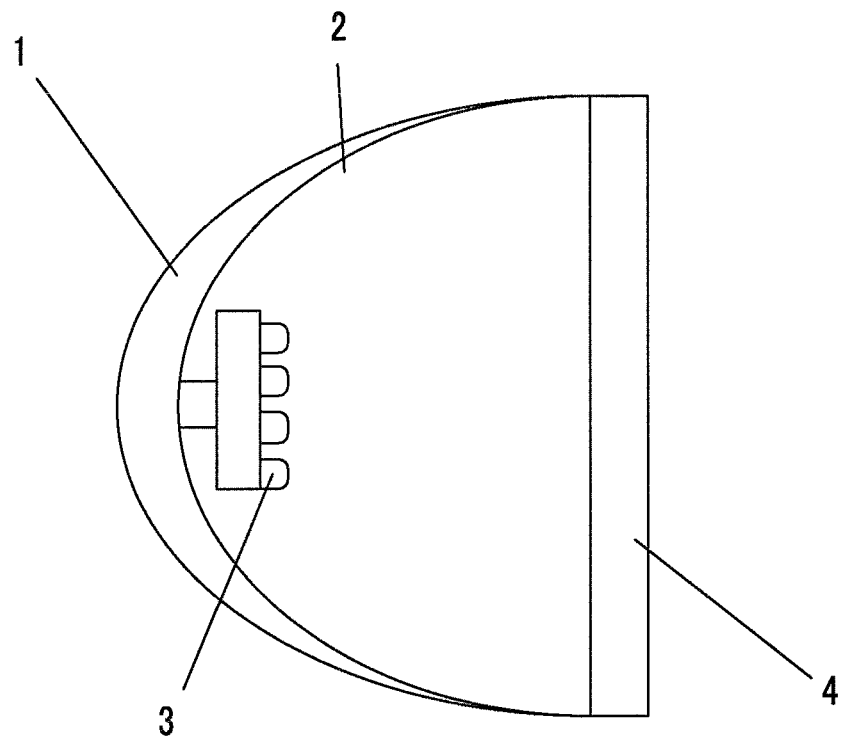
FIG. 1 is a schematic view showing an example of the illuminating device of the present invention.
Figure 2:
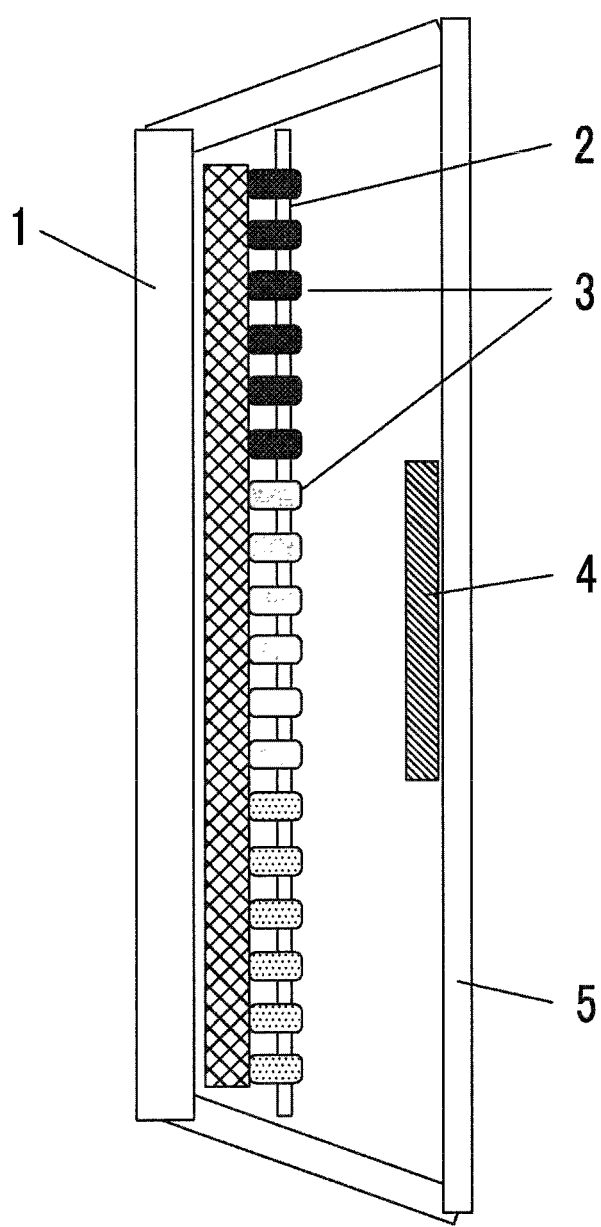
FIG. 2 is a cross-sectional view showing another example of the illuminating device of the present invention.

The basic structure of the illuminating device is shown in FIGS. 1 and 2.

FIG. 1 shows an illuminating device in which a sheet-like polarization state regulation member 4 is disposed in an opening portion of a reflective housing 1 that holds a light-emitting light source 3.

Moreover, FIG. 2 shows an illuminating device that has the light-emitting light source 3 including plural unit light sources having different emission wavelengths and the sheet-like polarization state regulation member 4 which is disposed in a portion of the device. According to the illuminating device of FIG. 2, a known circular polarizing plate can be used, and there is an advantage that the amount of the members thereof used can be reduced.

In FIGS. 1 and 2, 2 indicates a reflective plane (reflective film), and 5 indicates a protector plate respectively.

In the present invention, a polarization state of a wavelength region of a portion of the emission wavelengths is changed into circular polarization, and a degree of circular polarization of light in the wavelength band for regulation among the light rays to be irradiated is 0.3 or higher.

Herein, "a portion of the emission wavelengths" means 20% or more of the emission wavelength region, and preferably means 20% to 80% thereof.

The degree of circular polarization of light in the wavelength band for regulation among light rays to be irradiated is 0.3 or higher, preferably 0.6 or higher, and more preferably 0.8 or higher. If the degree of circular polarization is less than 0.3, sometimes a plant growth regulation effect is not exerted.

Herein, the polarization state of light can be indicated by the sum of right circular polarization and left circular polarization. For example, when a right circular polarization component and a left circular polarization component have the same intensity, the sum thereof becomes linear polarization, and by the bearing determined according to the phase difference between left and right circular polarization, the electric vector thereof vibrates. When there is a difference in the intensity between the right and left circular polarization components, elliptical polarization occurs, and when there is only one component, perfect circular polarization occurs.

Herein, provided that the intensity of the right circular polarization component of light is $I_R$, and the intensity of the left circular polarization component is $I_L$, $|I_R-I_L|/|I_R+I_L|$ is defined as a degree of circular polarization.

Regarding the sense of circular polarization, when light is viewed in a direction in which it comes straight toward the viewer, if the leading end of the electric field vector turns clockwise with the passage of time, this is right polarization, and if the leading end turns counterclockwise, this is left polarization.

The polarization state of each wavelength of the light emitted from the light-emitting light source can be measured using a spectroradiometer or a spectrometer on which a circular polarizing plate is mounted. In this case, the intensity of the light measured through a right-circular polarizing plate corresponds to $I_R$, and the intensity of the light measured through a left-circular polarizing plate corresponds to $I_L$. Moreover, general light sources such as an incandescent light bulb, a mercury lamp, a fluorescent lamp, and an LED practically emit natural light, but characteristics of the circular polarizing plate, which is mounted on the above sources, causing polarization of the polarization state regulation member can be measured using, for example, a polarization phase difference analyzer AxoScan manufactured by AXOMETRICS.

<Light-Emitting Light Source>

The light-emitting light source is not particularly limited and can be appropriately selected according to the purpose. Examples thereof include a fluorescent lamp, an LED, a discharge lamp such as a mercury lamp, a tungsten lamp, laser light, an organic light emitting diode (OLED) lamp, a metal halide lamp (meta-halide), a xenon lamp, and the like. Among these, an LED is particularly preferable in view of efficiency.

The light having a wavelength obtained by light emission may be used as is, or the light having been converted by a phosphor may be used.

In addition, for regulating plant growth, it is preferable to use an LED that emits light having a wavelength highly efficient for raising plants. Specifically, it is preferable to use a light source having a high energy at either or both of wavelengths of around 460 nm and 660 nm.

<Polarization State Regulation Member>

The polarization state regulation member is a member regulating the polarization state of the light-emitting light source.

Herein, the words "regulating the polarization state of the light-emitting light source" mean the action of adjusting a difference between the polarization state of the light having been just emitted from the light source and the polarization state of the light having passed through the polarization state regulation member.

The width of at least one wavelength band for regulation of the polarization state regulation member is preferably from 60 nm to 250 nm, and more preferably 80 nm to 200 nm. If the width of the wavelength band for regulation is less than 60 nm, sometimes a desired plant growth regulation effect is not exerted, and if it exceeds 250 nm, plural growth regulation effects overlap each other, so sometimes the effects are cancelled out.

Herein, the width of the wavelength band for regulation can be measured using, for example, a polarization phase difference analyzer AxoScan manufactured by AXOMETRICS.

The polarization state regulation member is not particularly limited and can be appropriately selected according to the purpose. Examples thereof include a polarizing plate, a circular polarizing plate, a circularly polarized light-reflecting plate, and the like. Among these, in view of the plant growth regulation effect and light utilization efficiency, a circularly polarized light-reflecting plate is preferable.

In addition, the polarization state regulation member can be detachable, and is preferably replaceable.

<<Circular Polarizing Plate>>

The circular polarizing plate includes a retardation plate and a polarizing plate. Specifically, it includes a linear polarizing plate and a λ/4 wave plate. When such a circular polarizing plate is used as the polarizing state regulation member, if a wavelength of the polarization state is selected by using the λ/4 wave plate described later and the constitution shown in FIG. 2, or if a polarizing plate that has linear polarization absorption dichroism is used in a portion of the emission wavelength region, wavelength selectivity of the polarization state can be regulated.

—Linear Polarizing Plate—

The linear polarizing plate transmits specific linearly polarized light among light rays passing through this plate and absorbs linearly polarized light that is orthogonal thereto.

The linear polarizing plate has at least a polarizing layer and a substrate, and optionally further includes other layers.

——Polarizing Layer——

The polarizing layer contains at least a polarizer and a binder resin, and optionally further contains other components.

Examples of the polarizer include iodine, dichroic dyes, anisotropic metal nanoparticles, carbon nanotubes, metal complexes, and the like.

The binder resin is not particularly limited and can be appropriately selected according to the purpose. Examples thereof include polyvinyl alcohol, polymethacrylic acid, polyacrylic acid, polyethylene terephthalate, polyvinyl butyral, polymethyl methacrylate, polyvinyl formaldehyde, polycarbonate, cellulose butyrate, polystyrene, polyvinyl chloride, polyvinylidene chloride, polyethylene adipamide, polyvinyl acetate, copolymers of these (for example, a vinyl chloride-vinyl acetate copolymer and a styrene-methyl methacrylate copolymer), and the like. One kind of these may be used alone, or two or more kinds thereof may be used concurrently.

The thickness of the polarizing layer is not particularly limited and can be appropriately selected according to the purpose. The thickness is preferably 10 µm to 300 µm.

——Substrate——

The substrate is not particularly limited in terms of the shape, structure, size, and the like and can be appropriately selected according to the purpose. Examples of the shape include a flat plate shape, a sheet shape, and the like. The structure may be, for example, a single layer structure or a laminated structure, and can be appropriately selected.

The material of the substrate is not particularly limited, and any of inorganic and organic materials can be preferably used.

Examples of the inorganic materials include glass, quartz, silicon, and the like.

Examples of the organic materials include acetate-based resins such as triacetyl cellulose (TAC); polyester-based resins, polyethersulfone-based resins, polysulfone-based resins, polycarbonate-based resins, polyamide-based resins, polyimide-based resins, polyolefin-based resins, acrylic resins, polynorbornene-based resins, cellulose, polyarylate-based resins, polystyrene-based resins, polyvinyl alcohol-based resins, polyvinyl chloride-based resins, polyvinylidene chloride-based resins, and the like. One kind of these may be used alone, or two or more kinds thereof may be used concurrently.

As the substrate, a synthetic product may be used appropriately, or a commercially available product may be used.

The thickness of the substrate is not particularly limited and can be appropriately selected according to the purpose. The thickness is preferably 10 µm to 2,000 µm and more preferably 50 µm to 500 µm.

The polarizing plate can be produced by coating a coating liquid containing the polarizer and the binder resin onto the substrate, drying the resultant to obtain a coating film, and stretching the film in a certain direction.

—λ/4 Wave Plate—

The λ/4 wave plate is not particularly limited and can be appropriately selected according to the purpose. Examples thereof include stretched polycarbonate film, stretched norbornene-based polymer film, transparent film that contains aligned inorganic particles such as strontium carbonate having birefringence, thin film obtained by obliquely vapor-depositing an inorganic dielectric substance on a support, and the like.

Examples of the λ/4 wave plate include (1) a retardation plate which is described in JP1993-27118A (JP-H05-27118A) and JP1993-27119A (JP-H05-27119A) and is obtained by laminating birefringent film having a large extent of retardation on birefringent film having a small extent of retardation such that optical axes thereof become orthogonal to each other, (2) a retardation plate which is described in JP1998-68816A (JP-H10-68816A) and obtained by laminating polymer film having a λ/4 wavelength in a specific wavelength on polymer film made of the same material as the above film and having a λ/2 wavelength in the same wavelength to obtain a λ/4 wavelength in a wide wavelength region, (3) a retardation plate which is described in JP1998-90521A (JP-H10-90521A) and can achieve a λ/4 wavelength in a wide wavelength region by laminating two sheets of polymer films on each other, (4) a retardation film which can achieve a λ/4 wavelength in a wide wavelength region by using modified polycarbonate film described in WO00/26705A and, (5) a retardation plate which can achieve a λ/4 wavelength in a wide wavelength region by using cellulose acetate film described in WO00/65384A, and the like.

As the λ/4 wave plate, commercially available products can be used. Examples of the commercially available products include a product having a trade name of Pureace WR (manufactured by TEIJIN LIMITED), and the like.

The circular polarizing plate used in the present invention includes the linear polarizing plate and the λ/4 wave plate, and these plates are adhered to each other such that a polarization absorption axis of the linear polarizing plate forms an angle of 45° to an optical axis of the λ/4 wave plate. Examples of the adhering method include a method of laminating rolls on each other by using adhesive film, and the like. When the circular polarizing plate is mounted on the light-emitting light source, if the linear polarizing plate is used by being disposed as a plane close to the light source, the light can be converted into circularly polarized light.

<<Circularly Polarized Light-Reflecting Plate>>

Examples of the circularly polarized light-reflecting plate include (1) a circularly polarized light-reflecting plate having a cholesteric liquid crystal structure, (2) a circularly polarized light-reflecting plate including a linearly polarized light-reflecting plate and a λ/4 wave plate, and the like.

—(1) Circularly Polarized Light-Reflecting Plate Having a Cholesteric Liquid Crystal Structure—

The cholesteric layer that selectively reflects circularly polarized light needs to be adjusted to have a central wavelength for selective reflection in accordance with the wavelength of the light-emitting light source. Examples of the liquid crystal phase that selectively reflects circularly polarized light include a cholesteric liquid crystal phase having a helical structure and a liquid crystal phase having a chiral smectic structure. A liquid crystalline substance showing the cholesteric liquid crystal phase or the chiral smectic liquid crystal phase can be formed by mixing achiral liquid crystalline compound with a chiral compound, or can be obtained using another method in which the above compounds are copolymerized to form a polymeric liquid crystal or polymer film.

A central wavelength λ of a selective reflection band depends on a pitch length P (period of helix) of the helical structure in the chloresteric phase or the chiral smectic phase, and on an average refractive index n of the cholesteric layer and the relationship of $\lambda = n \times P$. Accordingly, if the pitch length of the helical structure is regulated, the wavelength showing selective reflectivity can be adjusted. Since the pitch length depends on the type of the chiral compound of the liquid crystal composition or the concentration of the compound added, if these are adjusted, a desired pitch length can be obtained. Moreover, since Δλ depends on birefringence Δn of the liquid crystal compound and the pitch length P, a half of the selective reflection band depends on the relationship of $\Delta\lambda = \Delta n \times P$. Consequently, a width of the selective reflection band can be regulated by adjusting Δn. Δn can be adjusted by adjusting the type of the liquid crystal or the mixing ratio thereof or regulating the temperature at the time of fixing alignment. In addition, as other means for widening the band of the selective reflection band, a method of laminating two or more cholesteric liquid crystal layers having different pitch lengths P, or a method of varying the pitch in the thickness direction of the cholesteric layer can be used.

In the selective reflection performed by the cholesteric liquid crystal, if the twisting direction (sense) of the helix of the cholesteric liquid crystal is the right, right-circularly polarized light is reflected, and left-circularly polarized light is transmitted. If the sense is the left, left-circularly polarized light is reflected, and right-circularly polarized light is transmitted. Therefore, for plant growth regulation, if the left-circularly polarized light is irradiated, and the component of right-circularly polarized light is not irradiated, the cholesteric liquid crystal having right-handed sense can be used as the circularly polarized light-reflecting member. When the right-circularly polarized light is irradiated, and the component of left-circularly polarized light is not irradiated, a cholesteric liquid crystal layer having left-handed sense can be used as the circularly polarized light-reflecting member.

Further, as the circularly polarized light-reflecting plate, two or more wavelength bands for regulating polarized light may be used, and this is preferable since an effect of obtaining two or more kinds of growth regulation actions are obtained simultaneously.

Hereinafter, the materials constituting the cholesteric layer and the method for forming the cholesteric layer will be described.

The cholesteric layer contains a liquid crystalline compound and a chiral compound, and can be obtained by fixing a cholesteric liquid crystalline composition containing an air interface alignment regulatory agent, other compounding agents that are optionally added (for example, a polymerization initiator, a crosslinking agent, and a surfactant), and other optional components.

As the liquid crystalline compound, low-molecular weight liquid crystalline compounds and polymeric liquid crystalline compounds are preferable. Among these, the low-molecular weight liquid crystal compounds are more preferable since these are aligned in a short time and exhibit a high degree of uniformity of the alignment.

The liquid crystalline compound preferably has a polymerizable group, and more preferably shows a nematic phase or a chiral smectic phase. Moreover, a molecular shape thereof is preferably disk-like shape or a rod-like shape. In view of productivity, a rod-like shape is more preferable, and when it is important to reduce angle-dependency of the width of selective reflection, the disk-like shape is more preferable. The rod-like nematic liquid crystalline compounds not containing a polymerizable group are described in various documents (for example, Y. Goto et al., Mol. Cryst. Liq. Cryst. 1995, Vol. 260, pp 23-28).

The polymerizable group is not particularly limited and can be introduced into the nematic liquid crystalline compound by a known method. The polymerizable group is not particularly limited and can be appropriately selected according to the purpose, and examples thereof include an epoxy group, a thioepoxy group, an oxetanyl group, a thietanyl group, an aziridinyl group, a pyrrole group, a fumarate group, a cinnamoyl group, an isocyanate group, an isothiocyanate group, an amino group, a hydroxyl group, a carboxyl group, an alkoxysilyl group, a mercapto group, a vinyl group, an allyl group, a methacryl group, an acryl group, and the like. One kind of these may be used alone, or two or more kinds thereof may be used concurrently.

As the disk-like compound having a polymerizable group, the compounds described in JP1996-27284A (JP-H08-27284A), JP2001-10028A, and JP2006-76992A can be preferably used. If two or more kinds of polymerizable nematic liquid crystalline compounds are concurrently used, it is possible to inhibit precipitation of crystals at the time of coating and alignment or reduce the alignment temperature.

For example, if a polymerizable nematic liquid crystalline compound is mixed with a chiral compound (optically active compound), a cholesteric liquid crystalline composition is obtained.

The chiral compound is not particularly limited, and known compounds (for example, chiral agents for TN and STN described in "Liquid Crystal Device Handbook", Chapter 3, Section 4-3, p. 199, edited by the $142^{nd}$ Committee of the Japan Society for the Promotion of Science, 1989), isosorbide, and isomannide derivatives can be used.

The chiral compound (optically active compound) generally contains asymmetric carbon atoms. However, axially asymmetric compounds or planarly asymmetric compounds not containing asymmetric carbon atoms can also be used as the chiral compound.

Examples of the axially asymmetric compound or planarly asymmetric compound include binaphthyl, helicene, paracyclophane, derivatives of these, and the like.

The chiral compounds that induce cholesteric liquid crystals to have a helical structure result in a different helical sense or helical pitch depending on the compound, so it is preferable to select the compound according to the purpose. As a method for measuring helical sense or pitch, the methods described in "Introduction to Experimental Liquid Crystal Chemistry", edited by The Japanese Liquid Crystal Society, published in 2007 by Sigma Publishing Co., Ltd., p. 46, and "Liquid Crystal Handbook", the Editing Committee of Liquid Crystal Handbook, Maruzen Publishing Co., Ltd., p. 196 can be used.

The chiral compound may contain a polymerizable group. When the chiral compound contains a polymerizable group, by a polymerization reaction of a polymerizable nematic liquid crystalline compound, a polymer having a nematic liquid crystalline repeating unit and an optically active structure can be formed. As the polymerizable group of the optically active compound, the same group as the polymerizable group of the polymerizable nematic liquid crystalline compound is preferable. Accordingly, as the polymerizable group of the optically active compound, an unsaturated polymerizable group, an epoxy group, an aziridinyl group, or the like is preferable, an unsaturated polymerizable group is more preferable, and an ethylenically unsaturated polymerizable group is even more preferable.

When the chiral agent contains a photoisomerizing group, this is preferable since a pattern having a desired reflection wavelength corresponding to the emission wavelength can be formed by coating and aligning the agent and then performing irradiation of actinic light rays or the like through a photomask. As the photoisomerizing group, an isomerizable moiety of a photochromic compound and azo, azoxy, and cinnamoyl groups are preferable. As specific compounds, it is possible to use the compounds described in JP2002-80478A, JP2002-80851A, JP2002-179668A, JP2002-179669A, JP2002-179670A, JP2002-179681A, JP2002-179682A, 3P2002-338575A, JP2002-338668A, JP2003-313189A, and JP2003-313292A.

The content of the optically active compound is preferably 0.01 mol % to 200 mol % and more preferably 1 mol % to 30 mol % of the amount of the polymerizable nematic liquid crystalline compound.

It is preferable to add a polymerization initiator for a polymerization reaction to the cholesteric liquid crystalline composition. The polymerization reaction includes a thermal polymerization reaction using a thermal polymerization initiator and a photopolymerization reaction using a photopolymerization initiator. Among these, the photopolymerization reaction using a photopolymerization initiator is particularly preferable.

The photopolymerization initiator is not particularly limited and can be appropriately selected according to the purpose, and examples thereof include an α-carbonyl compound, acyloin ether, an α-hydrocarbon-substituted aromatic acyloin compound, a polynuclear quinone compound, a combination of a triarylimidazole dimer and p-aminophenylketone, an oxadiazole compound, halomethylated triazine derivatives, halomethylated oxadiazole derivatives, imidazole derivatives, anthraquinone derivatives, benzanthrone derivatives, benzophenone derivatives, thioxanthone derivatives, acridine derivatives, phenazine derivatives, oxime derivatives, and the like.

The content of the photopolymerization initiator is preferably 0.01% by mass to 20% by mass and more preferably 0.5% by mass to 5% by mass of the solid content of the cholesteric liquid crystalline composition.

For polymerization, a crosslinking agent can be optionally added to improve film strength and durability after curing. As the crosslinking agent, those cured by UV rays, heat, moisture, and the like can be preferably used.

The crosslinking agent is not particularly limited and can be appropriately selected according to the purpose. Examples thereof include polyfunctional acrylate compounds such as trimethylolpropane tri(meth)acrylate and pentaerythritol tri(meth)acrylate; epoxy compounds such as glycidyl (meth)acrylate and ethylene glycol diglycidyl ether; aziridine compounds such as 2,2-bishydroxymethylbutanol-tris[3-(1-aziridinyl)propionate] and 4,4-bis(ethyleneiminocarbonylamino)diphenylmethane; isocyanate compounds such as hexamethylene diisocyanate and biuret-type isocyanate; polyoxazoline compounds having an oxazoline group on a side chain; alkoxysilane compounds such as vinyltrimethoxysilane, N-(2-aminoethyl)-3-aminopropyltrimethoxysilane; and the like. Moreover, according to the reactivity of the crosslinking agent, known catalysts can be used to improve productivity in addition to the film strength and durability. One kind of these compounds may be used alone, or two or more kinds thereof may be used concurrently.

The content of the crosslinking agent is preferably 3% by mass to 20% by mass and more preferably 5% by mass to 15% by mass. If the content of the crosslinking agent is less than 3% by mass, sometimes the effect of improving crosslink density is not obtained, and if it exceeds 20% by mass, sometimes stability of the cholesteric layer deteriorates.

—Air Interface Alignment-Regulating Agent—

An alignment-regulating agent that contributes to the stable and rapid formation of a cholesteric liquid crystal layer of a planar alignment may be added to the liquid crystal composition. Examples of the alignment regulatory agent include fluorine-containing (meth)acrylate-based polymers and a compound represented by the following General formula (1). The composition may contain two or more kinds selected from these. These compounds can slightly reduce the tilt angle of the molecules of the liquid crystal compound or practically realize horizontal alignment in the air interface of the layer. In the present specification, the "horizontal alignment" means a state where the long axis of the liquid crystal molecule is in parallel with the film surface, but it does not mean that the state is required to be strictly parallel. In the present specification, it means the alignment in which the tilt angle with respect to the horizontal plane is less than 20°. When the liquid crystal compound forms horizontal alignment around the air interface, alignment defectiveness is not easily caused. Accordingly, transparency for the light in a wavelength region in which the light is not converted into polarized light is improved, and a degree of polarization with respect to the light in a wavelength region in which the light is converted into polarized light can be increased. On the other hand, if the molecules of the liquid crystal compound are aligned at a large tilt angle, the helical axis of the cholesteric liquid crystal phase deviates from the normal line of the film surface. Accordingly, this is not preferable since a reflectance is reduced, a fingerprint pattern is formed, and a degree of polarization is reduced due to the increase in haze or refractiveness.

The fluorine-containing (meth)acrylate-based polymer usable as the air interface alignment regulatory agent is described in, for example, paragraphs [0018] to [0043] of JP2007-272185A.

Hereinafter, the compound that is usable as the air interface alignment-regulating agent and represented by the following General formula (1) will be described.

[Chem. 1]

General formula (1)

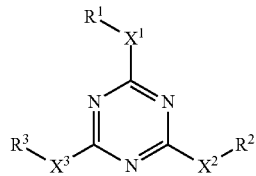

In the General formula (1), each of $R^1$, $R^2$, and $R^3$ independently represents a hydrogen atom or a substituent, and $X^1$, $X^2$, and $X^3$ represent a single bond or a divalent linking group. The substituents represented by each of $R^1$ to $R^3$ are preferably substituted or unsubstituted alkyl groups (among these, unsubstituted alkyl groups or fluorine-substituted alkyl groups are more preferable), aryl groups (among these, aryl groups having a fluorine-substituted alkyl group are preferable), substituted or unsubstituted amino groups, alkoxy groups, alkylthio groups, or halogen atoms. The divalent linking group represented by each of $X^1$, $X^2$, and $X^3$ is preferably a divalent linking group selected from a group consisting of an alkylene group, an alkenylene group, a divalent aromatic group, a divalent heterocyclic group, —CO—, —NRa— (Ra is an alkyl group having 1 to 5 carbon atoms or a hydrogen atom), —O—, —S—, —SO—, —SO$_2$—, and a combination of these. The divalent linking group is more preferably a divalent linking group selected from a group consisting of an alkylene group, a phenylene group, —CO—, —NRa—, —O—, —S—, and —SO$_2$— or a divalent linking group formed by combining at least two groups selected from the above groups. The number of carbon atoms of the alkylene group is preferably 1 to 12. The number of carbon atoms of the alkenylene group is preferably 2 to 12, and the number of carbon atoms of the divalent aromatic group is preferably 6 to 10.

Examples of the compound that is usable as the air interface alignment regulatory agent and represented by the General formula (1) include the compounds described in JP2005-99248A and the like. Moreover, as the air interface alignment regulatory agent, one kind of the compound represented by the General formula (1) may be used alone, or two or more kinds thereof may be used concurrently.

The amount of the compound represented by the General formula (1) added to the cholesteric liquid crystalline composition is preferably 0.01% by mass to 10% by mass, more preferably 0.01% by mass to 5% by mass, and particularly preferably 0.02% by mass to 1% by mass, based on the total mass of the cholesteric liquid crystal compound.

In order to adjust surface tension of the coating film, which is obtained by coating the cholesteric liquid crystalline composition containing the polymerization initiator and the liquid crystal compound on a substrate film, and to make the film thickness uniform, a surfactant can be used.

As the surfactant, surfactants that do not hinder the alignment can be appropriately selected and used.

As the surfactant, for example, nonionic surfactants containing cyclohexane or an alkyl fluoride group in a hydrophobic portion can be preferably used, and particularly, oligomers having two or more hydrophobic portions in a molecule are preferable.

As the surfactant, commercially available products can be used, and as the commercially available products, for example, PolyFox PF-151N, PF-636, PF-6320, PF-656, PF-6520, PF-3320, PF-651, and PF-652 manufactured by OMNOVA Solutions Inc., Futagent FTX-209F, FTX-208G, and FTX-204D manufactured by Neos Corporation, Surflon KH-40 manufactured by AGC SEIMI CHEMICAL CO., LTD., and the like can be used. Moreover, the fluorinated compounds described in paragraph [0087] of JP2002-341126A, and the fluorinated compounds described in paragraphs [0064] to [0080] and [0092] to [0096] of JP2005-99248A can be preferably used.

The content of the surfactant is preferably 0.01% by mass to 1% by mass in the cholesteric layer. If the content of the surfactant is less than 0.01% by mass, surface tension in the air interface is not sufficiently reduced, so sometimes defectiveness is caused in the alignment. If it exceeds 1% by mass, the surplus surfactant forms a non-uniform structure in the air interface, so sometimes alignment uniformity deteriorates.

In a method for producing the cholesteric layer, a cholesteric liquid crystalline composition, which is obtained by dissolving the polymerizable liquid crystal compound, and the polymerization initiator, the chiral agent and the surfactant that are optionally further added, and the like in a solvent, is coated onto a horizontal alignment film on a substrate and dried to obtain a coating film, the coating film being irradiated with actinic light rays to polymerize the cholesteric liquid crystalline composition, whereby a cholesteric layer in which cholesteric regularity has been fixed can be formed. In addition, a laminate film consisting of plural cholesteric layers can be obtained by repeating the production process of the above cholesteric layer.

The solvent used for preparing the cholesteric liquid crystalline composition is not particularly limited and can be appropriately selected according to the purpose, but organic solvents are preferably used.

The organic solvent is not particularly limited and can be appropriately selected according to the purpose, and examples thereof include ketones, alkyl halides, amides, sulfoxides, heterocyclic compounds, hydrocarbons, esters, ethers, and the like. One kind of these may be used alone, or two or more kinds thereof may be used concurrently. Among these, when environmental load is taken into consideration, ketones are particularly preferable.

The horizontal alignment film can be provided by means such as rubbing treatment of organic compounds or polymers (resins such as polyimide, polyvinyl alcohol, polyester, polyarylate, polyamideimide, polyetherimide, polyamide, and modified polyamide), oblique vapor-deposition of inorganic compounds, formation of a layer having microgrooves, and accumulation of organic compounds (for example, ω-tricosanoic acid, dioctadecylmethyl ammonium chloride, and methyl stearate) by a Langmuir-Blodgett process (LB film). Moreover, an alignment film that obtains an aligning function by being provided with an electric field or magnetic field or being irradiated with light is also known. Among these, the alignment film formed by the rubbing treatment of a polymer is particularly preferable. The rubbing treatment can be performed by rubbing the surface of a polymer layer several times with paper or cloth in a certain direction.

The method of coating the cholesteric liquid crystalline composition onto the alignment film is not particularly limited and can be appropriately selected according to the purpose, and examples thereof include a curtain coating process, an extrusion coating process, a direct gravure coating process, a die coating process, a spin coating process, a dip coating process, a spray coating process, a slide coating process, and the like. Further, the coating can also be performed by transferring the cholesteric liquid crystalline composition, which has been separately coated onto a support, to an alignment film. The coated cholesteric liquid crystalline composition is heated to align the liquid crystalline composition. The heating temperature is preferably 200° C. or lower and more preferably 130° C. or lower. By the above alignment treatment, an optical thin film in which the polymerizable rod-like nematic liquid crystalline compound is aligned while twisting on a helical axis in a direction practically perpendicular to the plane of the optical thin film is obtained.

The aligned polymerizable rod-like nematic liquid crystalline compound is further polymerized. For the polymerization, photopolymerization performed by light irradiation is better than thermal polymerization. It is preferable to use UV for the light irradiation. The irradiation energy is preferably 20 mJ/cm$^2$ to 50 mJ/cm$^2$ and more preferably 100 mJ/cm$^2$ to 1,500 mJ/cm$^2$. In order to accelerate the photopolymerization reaction, light irradiation may be performed under a heating condition or in a nitrogen atmosphere. The wavelength of UV for irradiation is preferably 350 nm to 430 nm. In view of stability, the higher the polymerization reaction rate, the better. The rate is preferably 70% or higher and more preferably 80% or higher.

The polymerization reaction rate can be determined by measuring a proportion of the consumed polymerizable functional group by using an IR absorption spectrum.

The thickness of the cholesteric layer is preferably 0.1 μm to 50 μm, more preferably 0.5 μm to 10 μm, and even more preferably 1.5 μm to 7 μm.

—(2) Circularly Polarized Light-Reflecting Plate Including a Linear Polarized Light-Reflecting Plate and a λ/4 Wave Plate—

Examples of the linearly polarized light-reflecting plate include (i) a linearly polarized light-reflecting plate having a multi-layer structure, (ii) a polarizer as a laminate of thin films having different types of birefringence, (iii) a wire grid-type polarizer, (vi) a polarizing prism, (v) a scattering anisotropic polarizing plate, and the like.

As the λ/4 wave plate, the same ones as described above can be used.

Examples of the (i) linearly polarized light-reflecting plate having a multi-layer structure include those obtained by laminating plural layers of dielectric thin films having different refractive indices. In order to form wavelength-selective reflection film, it is preferable to form a layer obtained by alternately laminating dielectric thin film having a high refractive index and dielectric thin film having a low refractive index in plural layers. However, the film is not limited to two or more types, and more types of the film may be used.

The number of the layers to be laminated is preferably 2 to 20, more preferably 2 to 12, even more preferably 4 to 10, and particularly preferably 6 to 8. If the number of the layers to be laminated exceeds 20, production efficiency decreases due to multi-layer vapor deposition, and sometimes the object and effects of the present invention cannot be achieved.

The order of laminating the dielectric thin films is not particularly limited and can be appropriately selected according to the purpose. For example, when the refractive indices of the adjacent films are high, a film having a lower refractive index is laminated first. Inversely, when the refractive indices of the adjacent films are low, a film having a higher refractive index is laminated first. The refractive index is determined to be high or low based on a refractive index of 1.8. Moreover, the criterion for determining whether a refractive index is high or low is not absolute. Among materials having a high refractive index, there may be materials having a relatively high refractive index and materials having a relatively low refractive index, and these may be alternately used.

Examples of materials of the dielectric thin film having a high refractive index include $Sb_2O_3$, $Sb_2S_3$, $Bi_2O_3$, $CeO_2$, $CeF_3$, $HfO_2$, $La_2O_3$, $Nd_2O_3$, $Pr_6O_{11}$, $Sc_2O_3$, $SiO$, $Ta_2O_5$, $TiO_2$, $TlCl$, $Y_2O_3$, $ZnSe$, $ZnS$, $ZrO_2$, and the like. Among these, $Bi_2O_3$, $CeO_2$, $CeF_3$, $HfO_2$, $SiO$, $Ta_2O_5$, $TiO_2$, $Y_2O_3$, $ZnSe$, $ZnS$, and $ZrO_2$ are preferable, and $SiO$, $Ta_2O_5$, $TiO_2$, $Y_2O_3$, $ZnSe$, $ZnS$, and $ZrO_2$ are particularly preferable.

Examples of materials of the dielectric thin film having a low refractive index include $Al_2O_3$, $BiF_3$, $CaF_2$, $LaF_3$, $PbCl_2$, $PbF_2$, $LiF$, $MgF_2$, $MgO$, $NdF_3$, $SiO_2$, $Si_2O_3$, $NaF$, $ThO_2$, $ThF_4$, and the like. Among these, $Al_2O_3$, $BiF_3$, $CaF_2$, $MgF_2$, $MgO$, $SiO_2$, and $Si_2O_3$ are preferable, and $Al_2O_3$, $CaF_2$, $MgF_2$, $MgO$, $SiO_2$, and $Si_2O_3$ are particularly preferable.

The materials of the dielectric thin film are not particularly limited in terms of the atomic ratio and can be appropriately selected according to the purpose. If the concentration of the atmospheric gas at the time of forming film is varied, the atomic ratio can be adjusted.

The method for forming the dielectric thin film is not particularly limited and can be appropriately selected according to the purpose. Examples of the method include a physical vapor deposition process (PVD process) such as ion plating, vacuum vapor deposition using ion beams, and sputtering, a chemical vapor deposition process (CVD process), and the like. Among these, a vacuum vapor deposition process and a sputtering process are preferable, and a sputtering process is particularly preferable.

As the sputtering process, a DC sputtering process by which film is formed at a high rate is preferable. Moreover, in the DC sputtering process, it is preferable to use materials having high conductivity.

In addition, the methods for forming multi-layers of film by the sputtering process include, for example, (1) a 1-chamber process in which films are formed alternately or sequentially from plural targets in a single chamber and (2) a multi-chamber process in which films are consecutively formed in plural chambers. Among these, in view of the productivity and prevention of contamination of the materials, a multi-chamber process is particularly preferable.

The thickness of the dielectric thin film is preferably $\lambda/16$ to $\lambda$, more preferably $\lambda/8$ to $3\lambda/4$, and even more preferably $\lambda/6$ to $3\lambda/8$, in order of an optical wavelength.

In the vapor-deposited dielectric layer, among light rays propagated in the vapor-deposited dielectric layer, a portion thereof undergoes multiple reflection for each dielectric thin film, and due to coherence of the reflected light, only the light having a wavelength which is determined by a product of the thickness of the dielectric thin film and a refractive index of the film with respect to the light is selectively transmitted. Moreover, a central transmission wavelength of the vapor-deposited dielectric layer exhibits angle dependency with respect to the incident light, and if the incident light is varied, it is possible to change the transmission wavelength.

As the (ii) polarizer as a laminate of thin films having different types of birefringence, for example, the polarizer described in JP1997-506837A (JP-H09-506837A) and the like can be used.

Specifically, if films are processed under conditions that are selected to obtain the relationship of a refractive index, it is possible to form a polarizer by using a wide variety of materials. Generally, one of the first materials needs to have a refractive index different from that of the second material in the selected direction. The difference in the refractive index can be made by various methods including stretching performed during or after the film formation, extrusion molding, and coating. Moreover, it is preferable that the materials have similar rheological properties (for example, melt viscosity) such that two kinds of materials can be subjected to extrusion simultaneously.

As the polarizer which is a laminate of thin films having different types of birefringence, commercially available products can be used, and examples of the commercially available products include DBEF (trade name) manufactured by 3M.

The (iii) wire grid-type polarizer is a polarizer that transmits one component of polarized light and reflects the other component thereof by birefringence of fine metal wires.

The wire grid polarizer is obtained by periodically arranging metal wires. Accordingly, it is used as a polarizer mainly in a terahertz wavelength band. In order that the wire grids function as a polarizer, it is necessary for the interval between wires to be sufficiently smaller than the wavelength of the incident electromagnetic wavelength.

In the wire grid polarizer, metal wires are arranged at the same interval. A component of polarized light that is in parallel with the longitudinal direction of the metal wire is reflected from the wire grid polarizer, and a component of polarized light in a polarizing direction perpendicular thereto is transmitted through the wire grid polarizer.

As the wire grid-type polarizer, commercially available products can be used. Examples of the commercially available products include a wire grid polarizer 50×50, NT46-636, and the like manufactured by Edmund Optics Inc.

—Diffuser Plate and Retardation Plate—

It is preferable that one of a diffuser plate and a retardation plate be placed between the light-emitting light source and the circularly polarized light-reflecting plate, in the respect that light recycling efficiency can be increased by resolving polarization when the reflected light is recycled.

A phase difference in the in-plane direction (in-plane retardation Re) of the retardation plate is preferably 300 nm or more and more preferably 1,000 nm or more at a wavelength of 550 nm. If the phase difference in the in-plane direction is less than 300 nm at a wavelength of 550 nm, polarization is not sufficiently resolved, and sometimes the recycling efficiency is lowered.

The diffuser plate or retardation plate may also function as a base substrate.

The diffuser plate or retardation plate may contain a UV absorber.

<Other Members>

The illuminating device of the present invention can optionally further include a reflector plate, a heat ray-shielding layer, a reflective layer, a heat ray-transmitting layer, a heat-conductive material, a polarization resolution inhibitory wall, and the like.

<Use>

As described below, the illuminating device of the present invention can be widely used in various field such as streetlamps, plant factories, the fishing industry, health care, and a medical field. Among these, the illuminating device is preferably used for a plant growth regulation method described later.

Herein, the mechanism relating to the illuminating device of the present invention is assumed to be as below.

Phytochromobilin and flavine as choromophores contained in photoreceptors such as phytochrome, cryptochrome, phototropin, and ZTL that are involved in the promotion and inhibition of flower bud formation, growth inhibition, and the like of plants are optically active compounds. Accordingly, these compounds exhibit absorption dichroism with respect to circularly polarized light around the light absorption wavelength region. That is, the light absorbed by the photoreceptor is left- or right-circularly polarized light. Compared to this light, polarized light having another sense is not easily absorbed, so even if this type of light is irradiated, it is difficult to induce the photoreceptor to function. Consequently, it is assumed that when only one of the left- and right-circularly polarized light is irradiated respectively, a phenomenon in which a difference is made in the growth may be caused. Here, the absorption dichroism is a phenomenon that can be confirmed in a solution system of the laboratory level, and it is generally considered that the above phenomenon cannot be observed in practice since a polarization state disappears due to scattering caused by intracellular substances before the polarized light reaches the chromophores. However, surprisingly, in the present invention, it was found that even in leaves or stems where the chromophores are present, the growth of a plant can be regulated according to the polarization state of the irradiated light.

The phytochrome involved in photoperiodism of plants includes a red light absorption type having absorption maximum at around 650 nm and a far-red light absorption type having absorption maximum at around 750 nm. By being irradiated with light at around 650 nm, the red light absorption type is converted into the far-red light absorption type. On the other hand, by being irradiated with light at around 750 nm, the far-red light absorption type is converted into the red light absorption type. Moreover, with the passage of time in a dark state, the far-red light absorption type is converted into the red light absorption type. The amount of the far-red light absorption type produced by the reaction regulates the flowering time. If the reaction is artificially regulated, it is possible to regulate the flowering time by, for example, night illumination performed in cultivation of chrysanthemums. As the illumination lamp, if the light source of the illuminating device of the present invention that irradiates right-circularly polarized light the phytochrome absorbs only in the absorption wavelength region of the phytochrome is used, it is possible to suppress the consumption of required power without diminishing the effect of the electric illumination.

—Nocturnal Harmful Insects—

In order to control armyworms as nocturnal harmful insects that are typical harmful insects of cabbage, spinach, and the like, a method of illuminating the vicinity of the crop in the night is used. However, this leads to a problem that flower buds are formed by the phytochrome reacting to the illumination light, and the product value is markedly lowered. As a countermeasure for this, sometimes an illuminating lamp free of red-light component is used. However, since this is an unnatural color shade, a weird atmosphere is created in the production area.

As the illuminating lamp for the above purpose, if the light source of the illuminating device of the present invention that irradiates left-circularly polarized light the phytochrome does not absorb only in the absorption wavelength region of the phytochrome is used, it is possible to make pest control compatible with inhibition of bolting even with white illumination light that does not make ordinary people feel a sense of incompatibility when they see the light.

—Street Lamp—

Moreover, there is a problem that due to the night illumination caused by streetlamps of farm roads in a farming area cultivating rice, a flowering time of rice is delayed, and the yield and quality decrease. Therefore, the streetlamps are covered so as to prevent light from hitting fields and paddies, or the illuminating lamp free of red-light component as described above is under examination. However, the former method has a problem with safety since the vicinity of the road cannot be recognized, and the latter method creates a weird atmosphere due to unnatural color shade. These problems may arise not only in rice cultivation but also in various crops. In order to solve these problems, if the light source as the illuminating device of the present invention that irradiates left-circularly polarized light the phytochrome does not absorb only in the absorption wavelength region of the phytochrome is used, it is possible to provide streetlamps that do not negatively affect the growth of plants, use white illumination light which is bright and does not cause incompatibility for the eyes, and do not need to be subjected to light shielding.

The illuminating device of the present invention focuses on the circular polarization absorption dichroism of plants, and irradiates natural light as is outside the wavelength band thereof. Accordingly, it is a light source which makes it possible to reduce the number of members for regulating the polarization state without reducing the light amount required for photosynthesis or the like, and can irradiate light of natural color shade without decreasing light utilization efficiency. Considering this principal of action, if the light having a wavelength required for green leaves is irradiated in a non-polarized state, and the light involved in the growth of stems is regulated to be circularly polarized light, it is possible to produce dwarfed compact potted flowers which have a low height and green leaves having a high product quality. Likewise, if a plant is irradiated with strong polarized light in the absorption wavelength of the chromophore, or inversely, irradiated with polarized light not absorbed, the plant may suffer from a certain type of stress. Therefore, there is a possibility that increase in the production of medicinal ingredients of medicinal herbs may be promoted, and good taste, nutritive components, aromatic components, and a ratio between components of secondary metabolites such as antioxidants of plants can be regulated.

Moreover, in a plant disease control method, which has drawn attention recently, for enhancing resistance against diseases by means of irradiating plants with UV light, if only the circularly-polarized light having effective sense is irradiated, it may be possible to reduce damage caused by UV rays by decreasing the total irradiation dose. Conversely, there is a possibility that optical repairability of DNA and other blue light bioswitch can be effectively activated at a low illuminance.

There are various types of plants and various types of chromophores on earth. Therefore, it is important to vary the wavelength band of circularly-polarized light and sense according to the purpose of regulation. Needless to say, sometimes it is preferable to simultaneously irradiate circularly polarized light having different sense, such as a case where right-circularly polarized light is irradiated in a certain wavelength, and a left-circularly polarized light is irradiated in another wavelength band. The illuminating device of the present invention can also be used for the above purpose.

The illuminating device of the present invention can be used in different modes by changing the wavelength band for conversion into polarized light and conversion members according to stages of growth process of plants, such as stages of dormancy, germination, maturation of seedling, cell elongation, and flower bud differentiation. Moreover, it is also possible to regulate the timing of irradiation, the light intensity, and the polarization state according to the circadian rhythm. In addition, the illuminating device can be used in different modes by emitting pulsed light or by irradiating light in different polarization states according to the site of the plant to be irradiated. Furthermore, in a plant factory, light irradiation performed by the illuminating device of the present invention may be combined with the regulation of humidity, temperature, and gas concentration.

—Fishing Industry and the Like—

There is a report reporting that some kinds of insects, crustaceans, and squids can recognize circularly-polarized light.

Moreover, there is a possibility that irradiation of circularly-polarized light into the sea may effectively gather fishes themselves to be caught and small fishes, small shrimps, plankton, and the like as prey of those fishes or selectively gather these, whereby only the target fishes that gather around the prey may be caught. At this time, the illuminating device of the present invention can be preferably used as an illuminating device.

(Plant Growth Regulation Method)

The plant growth regulation method of the present invention is characterized by using the illuminating device of the present invention as a source of light irradiation.

The plant growth regulation method includes plant growth promotion and plant growth inhibition.

The plant growth promotion means growth of plant body caused by elongation of plant length, stem length, internode, and the like, increase in length of lateral branches, and the like.

By the plant growth promotion action, the weight and length of crops can be increased rapidly, so the productivity increases. Moreover, large-sized crops can be easily cultivated. In addition, crops are rapidly matured in breeding, and this brings an advantage that the number of times of alternation of generations can be increased.

The plant growth inhibition means dwarfing of plant body by inhibition of elongation of plant length, stem length, internode, and the like, inhibition of the length of lateral branches, and the like. Moreover, dwarfing means a phenomenon in which stems or branches of a plant become thick and strong and resistant to unfavorable conditions of nature such as wind and rain, and the amount of nutrients such as chlorophyll and vitamin per unit area increases.

If plant height is decreased by the plant growth inhibition action, this brings an advantage that the plant becomes resistant to wind damage caused by typhoons and the like and does not easily fall down even if the number of grains increase. For example, in a case of rice, in order to increase the number of lanes for planting seedlings, it is possible to further increase the density of seedlings planted per unit area. If the plant growth inhibition action is applied to fruit trees (banana, mango, and the like) or palm trees (date, coconut, and the like) having a height of several meters, the fruits can be more easily harvested. Moreover, if some plants are smaller than ordinary plants, this brings advantages that the product quality is heightened in cut flowers, ornamental foliage plants, and bonsai plants, and buyers become interested in the plants, and the like.

In the plant growth regulation method of the present invention, irradiation timing regulation (circadian rhythm and growth process (stages of dormancy, germination, maturation of seedling, cell elongation, and the like)), pulsated illumination, and the wavelength band for conversion into polarized light are varied with the circadian rhythm and growth process. According to the plant and purpose, the timing regulation, pulsated illumination, and the wavelength band for conversion into polarized light are changed, and partial illumination is performed. Moreover, the above may be regulated in combination with the regulation of humidity, temperature, gas concentration, illuminance, and irradiation time.

Specifically, even in flower bud formation by day length, a regression reaction, chloroplast movement, gap opening, biosynthesis of flavonoids, and control of plant diseases (method of enhancing resistance to diseases by irradiating a plant with UV), UV damage can be reduced by means of irradiation of circularly-polarized light that is effective for one component.

Examples of the plant growth regulation method include the regulation of bending of light, on and off of gene transcription, and gene expression, the regulation of secondary metabolites (nutritive components, aromatic components, good taste, antioxidants, and medicinal ingredients), causing stress, optical repairability of DNA, blue light bioswitch, and the like.

—Subject Plants—

The subject plants used for the plant growth regulation method are not particularly limited and can be appropriately selected according to the purpose. Examples thereof include vegetables of Cucurbitaceae, Solanaceae, Fabaceae, Rosaceae, Brassicaceae, Asteraceae, Apiaceae, Chenopodiaceae, Poaceae, Malvaceae, Araliaceae, Labiatae, Zingiberaceae, Nymphaeaceae, and Araceae, cut flowers or ornamental flowers of potted plants of Asteraceae, Rosaceae, Araceae, Caryophyliaceae, Brassicaceae, Plumbaginaceae, Gentianaceae, Scrophulariaceae, Fabaceae, Paeoniaceae, Iridaceae, Solanaceae, Amaryllidaceae, Orchidaceae, Agavaceae, Comaceae, Rubiaceae, Salicaceae, Ericaceae, Oleaeceae, Magnoliaceae, Primulaceae, Begoniaceae, Labiatae, Geraniaceae, Crassulaceae, Ranunculaceae, Gesneriaceae, Cactaceae, ferns, Araliaceae, Moraceae, Commelinaceae, Bromeliaceae, Marantaceae, Euphorbiaceae, Piperaceae, Euphorbia pekinensis, Saxifragaceae, Onagraceae, Malvaceae, Myrtaceaea, Theaceae, and Nyctaginaceae, fruit trees of Rosaceae, Vitaceae, Moraceae, Ebenaceae, Ericaceae, Lardizabalaceae, Actinidiaceae, Passifloraceae, Rutaceae, Anacardiaceae, Bromeliaceae, and Mytaceae, and seaweeds.

More specific examples thereof include vegetables such as cucumber, melon, squash, bitter melon, zucchini, water melon, oriental pickling melon, wax gourd, sponge cucumber, spaghetti squash, tomato, bell pepper, pepper, eggplant, pepino, sweet pepper, peas, kidney beans, cowpeas, green soybeans, fava beans, winged beans, podded peas, tepary beans, hyacinth bean, strawberry, corn, okra, broccoli, white radish sprouts, watercress, Japanese mustard spinach, pickled greens, lettuce, Japanese sweet coltsfoot, garland chrysanthemum, edible chrysanthemum, celery, parsley, Japanese honewort, Japanese parsley, green onion, Chinese chive, asparagus, spinach, saltwort, udo, shiso, ginger, Japanese radish, turnip, horseradish, radish, rutabaga, kochab, garlic, Japanese leek, lotus roots, and taro; ornamental flowers such as aster, rhodanthe, thistle, gillyflower, stock, cauliflower, statice, Texas bluebell, snapdragon, sweetpea, iris, chrysanthemum, liatris, gerbera, marguerite, Gymnaderia savatierti, Shasta daisy, carnation, Gypsophilia paniculata, gentian, Chinese peony, winter cherry, lion, dahlia, calla, gladiolus, iris, freesia, tulip, daffodil, amaryllis, cymbidium, dracaena, rose, Japanese quince, cherry, peach, Japanese apricot, spirea, raspberry, Japanese rowan, comel, Cornus officinalis, Chinese ixora, bouvardia, willow, azelea, weeping forsythia, lily magnolia, cineraria, dimorphotheca, primula, petunia, begonia, gentian, coleus, geranium, pelargonium, rokeya, anthurium, clematis, lily of the valley, saintpaulia, cyclamen, ranunculus, gloxinia, dendrobium, cattleya, Phalaenopsis, vanda, epidendrum, oncidium, schlumbergera, Schlumbergera russelliana, epiphyllum, kalanchoe, nephrolepis, adiantum, taniwatari, pothos, dieffenbachia, spathiphyllum, syngonium, chlorophytum, schefflera, ivy, hevea, dracaena, cordyline, bridal veil, bromeliads, calathea, croton, peperomia, poinsettia, hydrangea, fuchsia, hibiscus, gardenia, broom teatree, camellia, bougainvillea, and tree peony; fruit trees such as Japanese pears, peach, turret, Japanese plum, apple, prune, nectarine, apricot, raspberry, Japanese apricot, grape, fig, persimmon, blueberry, akebi, kiwifruit, passionfruit, loquat, Satsuma mandarin, marcollette, lemon, yuzu, fingered citron, citrus hassaku, citrus grandis, flower yuzu, cumquat, Seminole, citrus iyo, navel orange, encore, nova, citrus tamurana, lime, citrus sudachi, citrus sphaerocarpa, citrus grandis, citrus tankan, mango, pineapple, and guava; seaweeds; and the like.

Among these, leafy vegetables and Japanese mustard spinach of pickled greens belonging to Brassicaceae are particularly preferable.

According to the plant growth regulation method of the present invention, prevention of harmful insects and inhibition of bolting (phenomenon in which a scape arises after flower bud differentiation) become compatible with each other, regulation of flowering time and regulation and promotion of the growth of plants (vegetables, fruits, and the like) can be conducted efficiently, and light pollution can be prevented.

EXAMPLES

Hereafter, examples of the present invention will be described, but the present invention is not limited to these examples.

—Preparation of Cholesteric Liquid Crystal Coating Liquid Composition—

Coating liquids (A), (B), (C), (D), (E), and (F) having the composition shown in the following Table 1 were prepared respectively. In addition, the numerical values of the coating liquid composition of Table 1 indicate parts by mass. Moreover, the central wavelength of the selective reflection peak of the coating liquid that was measured after fixation of alignment and polymerized state is described together with the helical sense of cholesteric liquid crystals.

TABLE 1

| | Coating liquid | | | | | |
|---|---|---|---|---|---|---|
| Components (parts by mass) | (A) | (B) | (C) | (D) | (E) | (F) |
| Polymerizable liquid crystal compound 1* | 50 | 50 | 50 | 50 | 50 | 100 |
| Polymerizable liquid crystal compound 2* | 50 | 50 | 50 | 50 | 50 | 0 |
| Paliocolor LC-756 manufactured by BASF | 7.5 | 6.5 | 5.3 | 4.7 | 5.9 | 6.5 |
| Alignment-regulating agent: compound 3* | 0.04 | 0.04 | 0.04 | 0.04 | 0.04 | 0.04 |
| Polymerization initiator* | 3 | 3 | 3 | 3 | 3 | 3 |
| CHCl$_3$ | 300 | 300 | 300 | 300 | 300 | 300 |
| Helical sense of cholesteric liquid crystals | Right | Right | Right | Right | Right | Right |
| Central wavelength of selective reflection peak (nm) | 435 | 500 | 610 | 700 | 550 | 420 |

*Polymerization initiator (manufactured by Ciba Specialty Chemicals K.K., Irgacure 819)
*Polymerizable liquid crystal compound 1
[Chem 2]

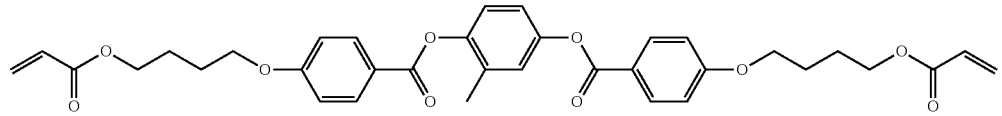 [SMILES: C=CC(=O)OCCCCOc1ccc(C(=O)Oc2ccc(OC(=O)c3ccc(OCCCCOC(=O)C=C)cc3)c(C)c2)cc1]

*Polymerizable liquid crystal compound 2

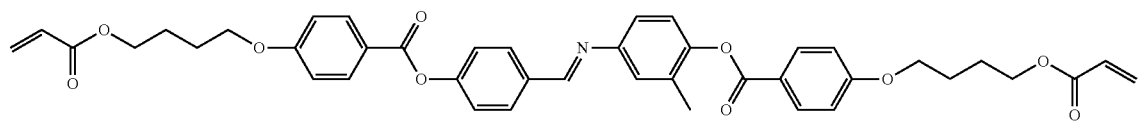 [SMILES: C=CC(=O)OCCCCOc1ccc(C(=O)Oc2ccc(/C=N/c3ccc(OC(=O)c4ccc(OCCCCOC(=O)C=C)cc4)c(C)c3)cc2)cc1]

*Alignment regulating agent: compound 3 (compound described in JP2005-99248A)

[Chem. 4]

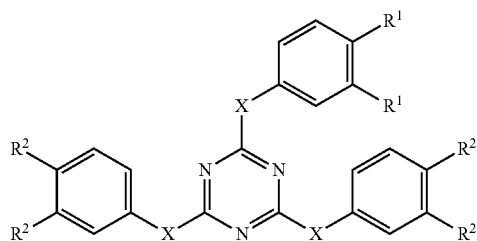

| $R^1$ | $R^2$ | X |
|---|---|---|
| (O)(CH$_2$)$_2$O(CH$_2$)$_2$(CF$_2$)$_6$F | O(CH$_2$)$_2$O(CH$_2$)$_2$(CF$_2$)$_6$F | NH |

(1) Each of the prepared coating liquids was coated using a wire bar at room temperature onto PET film manufactured by Fujifilm Corporation that had undergone rubbing treatment, such that the film thickness measured after drying became 3.5 μm. Moreover, a phase difference (retardation Re) in the in-plane direction of the PET film was 2,000 nm or more at a wavelength of 550 nm.

(2) The film was dried at room temperature for 30 seconds, and then heated in an environment of 100° C. for 2 minutes. Thereafter, by using a D bulb lamp (90 mW/cm) manufactured by Heraeus Nobleight Fusion UV K.K., the film was irradiated with UV for 6 to 12 seconds at 30° C. at an output of 60% to fix the cholesteric liquid crystal layer, thereby preparing a circularly polarized light-reflecting film.

The film was cooled to room temperature, and then the above steps (1) and (2) were repeated on the surface of the circularly polarized light-reflecting film.

Examples 1 to 6 and Comparative Examples 1 to 4

Based on the above preparation method, polarization state regulation films Ch1 to Ch4 shown in the following Table 2 were prepared respectively, and according to the combination shown in Table 3, polarization state regulation members of Examples 1 to 6 and Comparative examples 1 to 4 were prepared.

Moreover, as the linearly polarized light-reflecting plate of Example 5, based on the method described in JP1997-506837A (JP-H09-506837A), a reflecting plate that was prepared by adjusting the thickness of each layer so as to make a wavelength region for regulating polarization become 580 nm to 720 nm was used.

In addition, as the polarizing plate of Comparative example 4 and Example 6, an iodine-based polarizing plate HLC2-5618 manufactured by Sanritsu Co., Ltd. was used.

Further, as the λ/4 wave plate of Examples 5 and 6, Pureace manufactured by TEIJIN LIMITED was used.

TABLE 2

| | Polarization state regulation film | | | |
|---|---|---|---|---|
| | Ch1 | Ch2 | Ch3 | Ch4 |
| First layer | A | C | A | F |
| Second layer | B | D | B | None |
| Third layer | None | None | C | None |
| Fourth layer | None | None | D | None |

Subsequently, a degree of circular polarization of each of the prepared polarization state regulation members was measured. The results are shown in Table 3.

<Measurement of Degree of Circular Polarization>

By using a Mueller matrix polarimeter manufactured by Axometrics, Inc., a degree of circular polarization in a selective reflection wavelength region of each polarization state regulation member was measured in a wavelength scanning mode, and an average thereof was determined.

Next, as shown in FIG. 1, each of the prepared polarization state regulation members was disposed in front of a commercially available white LED lamp irradiating light, as shown in Table 3. In addition, Japanese mustard spinach was cultivated by being continuously irradiated with the light for 38 days in an environment of 25° C., and then the weight of the spinach was measured to determine the weight increment compared to before irradiation. The results are shown in Table 3.

In addition, in the following manner, overall energy utilization efficiency was measured, and a dwarfing effect and a growth effect were evaluated. The results are shown in Table 3. In each experiment, in order to prevent the evaluation results from being influenced by the difference in the intensity of the irradiated light, the overall light illuminance on the irradiated surface of the plant was equalized, and a distance between the light source and the plant was adjusted.

<Overall Energy Utilization Efficiency>

By using an optical power meter (manufactured by ANRITSU, ML9001A), a band-pass filter, and a spectrometer USB-2000 manufactured by Ocean Optics Corporation, an overall energy utilization efficiency at a wavelength of 350 nm to 800 nm was measured. Moreover, the overall energy utilization efficiency is indicated to be 100% when the polarization state regulation film was removed.

<Dwarfing Effect>

Regarding the weight increase of the plant in Comparative example 3, a case where 20% or more of weight reduction was caused was evaluated to be "effective for dwarfing", a case where a weight reduction of 10% or more and less than 20% was caused was evaluated to be "slightly effective for dwarfing", and a case where a weight reduction of 0% or more and less than 10% was caused was evaluated to be "ineffective for dwarfing".

<Growth Promotion Effect>

Regarding the weight increase in Comparative example 3, a case where 20% or more of weight increase was caused was evaluated to be "effective for growth promotion", a case where a weight increase of 10% or more and less than 20% was caused was evaluated to be "slightly effective for growth promotion", and a case where a weight increase of 0% or more and less than 10% was caused was evaluated to be "ineffective for growth promotion".

TABLE 3

| | | Example 1 | Example 2 | Example 3 | Example 4 |
|---|---|---|---|---|---|
| Light source | | LED | LED | LED | LED |
| Polarization state regulation member | Light source side | PET base | PET base | PET base | PET base |
| | Plant side | Ch1 | Ch2 | Ch4 | Ch3 |
| Polarization state | | A degree of circular polarization 0.8 | A degree of circular polarization 0.8 | A degree of circular polarization 0.8 | A degree of circular polarization 0.8 |
| Wavelength region for regulating polarization | | 400 nm-525 nm | 580 nm-720 nm | 600 nm-650 nm | 350 nm-750 nm |
| Wavelength band width for regulation | | 125 nm | 140 nm | 50 nm | 400 nm |
| Overall energy utilization efficiency (350 nm-800 nm) | | 85% | 85% | 88% | 72% |

TABLE 3-continued

| | | Comparative Example 1 | Comparative Example 2 | Comparative Example 3 |
|---|---|---|---|---|
| Weight increase of Japanese mustard spinach (g) | | 15 | 7 | 11 | 7 |
| Dwarfing effect | | Ineffective | Effective | Ineffective | Effective |
| Growth promotion effect | | Effective | Ineffective | Slightly effective | Ineffective |

| | | Comparative Example 1 | Comparative Example 2 | Comparative Example 3 |
|---|---|---|---|---|
| Light source | | LED | LED | LED |
| Polarization state regulation member | Light source side | Ch1 | Ch2 | PET base |
| | Plant side | PET base | PET base | None |
| Polarization state | | A degree of circular polarization 0.2 | A degree of circular polarization 0.2 | Non-polarization (a degree of circular polarization of 0) |
| Wavelength region for regulating polarization | | 400 nm-525 nm | 580 nm-720 nm | None |
| Wavelength band width for regulation | | 125 nm | 140 nm | — |
| Overall energy utilization efficiency (350 nm-800 nm) | | 82% | 82% | 100% |
| Weight increase of Japanese mustard spinach (g) | | 11 | 10 | 10 |
| Dwarfing effect | | Ineffective | Ineffective | Ineffective |
| Growth promotion effect | | Ineffective | Ineffective | Ineffective |

| | | Example 5 | Example 4 | Example 6 |
|---|---|---|---|---|
| Light source | | LED | LED | LED |
| Polarization state regulation member | Light source side | Linearly polarized light-reflecting plate | Polarizing plate | Polarizing plate |
| | Plant side | λ/4 wave plate | None | λ/4 wave plate |
| Polarization state | | A degree of circular polarization 0.8 | Linear polarization (a degree of circular polarization of 0) | A degree of circular polarization of 0.8 (left) |
| Wavelength region for regulating polarization | | 580 nm-720 nm | 350 nm-750 nm | 350 nm-750 nm |
| Wavelength band width for regulation | | 140 nm | 400 nm | 400 nm |
| Overall energy utilization efficiency (350 nm-800 nm) | | 88% | 43% | 41% |
| Weight increase of Japanese mustard spinach (g) | | 7 | 10 | 7 |
| Dwarfing effect | | Effective | Ineffective | Effective |
| Growth promotion effect | | Ineffective | Ineffective | Ineffective |

The illuminating device of the present invention improves the energy efficiency of irradiation. Accordingly, if the illuminating device is used, prevention of harmful insects and inhibition of bolting (phenomenon in which a scape arises after flower bud differentiation) become compatible with each other, regulation of flowering time and inhibition and promotion of the growth of plants (vegetables, fruits, and the like) can be conducted efficiently, and light pollution can be prevented. The illuminating device can be widely used in various fields such as streetlamps, plant factories, the fishing industry, health care, and a medical field.

What is claimed is:

1. An illuminating device comprising:
   a light-emitting light source; and
   a polarization state regulation member that regulates a polarization state of the light-emitting light source,
   wherein a width of at least one wavelength band for regulation of the polarization state regulation member is from 60 nm to 250 nm,
   wherein:
   the polarization state of a wavelength region of 20% to 80% of emission wavelengths is changed to circular polarization,
   a degree of circular polarization of light in a wavelength band for regulation among the light rays to be irradiated is 0.3 or higher, the degree of circular polarization being defined as $|I_R - I_L|/|I_R + I_L|$, wherein $I_R$ represents an intensity of a right circular polarization component of light, and $I_L$ represents an intensity of a left circular polarization component, and
   the polarization state regulation member is one of a circularly polarized light-reflecting plate and a circular polarizing plate including a linear polarizing plate and a λ/4 wave plate.

2. The illuminating device according to claim 1, wherein the polarization state regulation member is the circular polarizing plate including a linear polarizing plate and a λ/4 wave plate.

3. The illuminating device according to claim 1, wherein the polarization state regulation member is the circularly polarized light-reflecting plate.

4. The illuminating device according to claim 3, wherein the circularly polarized light-reflecting plate has a cholesteric liquid crystal structure.

5. The illuminating device according to claim 4, wherein the circularly polarized light-reflecting plate has two or more wavelength regions for regulating polarization.

6. The illuminating device according to claim 4, further comprising one of a diffuser plate and a retardation plate between the light-emitting light source and the circularly polarized light-reflecting plate.

7. The illuminating device according to claim 3, wherein the circularly polarized light-reflecting plate is composed of a linearly polarized light-reflecting plate and a λ/4 wave plate.

8. The illuminating device according to claim 7, further comprising one of a diffuser plate and a retardation plate between the light-emitting light source and the circularly polarized light-reflecting plate.

9. The illuminating device according to claim 3, further comprising one of a diffuser plate and a retardation plate between the light-emitting light source and the circularly polarized light-reflecting plate.

10. The illuminating device according to claim 9, wherein a phase difference in an in-plane direction of the retardation plate is 300 nm or more when being measured under a wavelength condition of 550 nm.

11. A plant growth regulation method that uses the illuminating device according to claim 1 as an irradiation light source.

* * * * *